(12) United States Patent
Hruska (10) Patent No.: US 6,199,781 B1
(45) Date of Patent: Mar. 13, 2001

(54) ANIMAL FEED PROCESSOR

(75) Inventor: Kevin Hruska, Gerald (CA)

(73) Assignee: Bridgeview Mfg. Inc. (CA)

( * ) Notice: Subject to any disclaimer, the term of this patent is extended or adjusted under 35 U.S.C. 154(b) by 0 days.

(21) Appl. No.: 09/302,280

(22) Filed: Apr. 30, 1999

(30) Foreign Application Priority Data

Oct. 13, 1998 (CA) .................................................. 2250313
Oct. 15, 1998 (CA) .................................................. 2250611

(51) Int. Cl.$^7$ ................................................... B02C 19/12
(52) U.S. Cl. ................................... 241/101.763; 241/604; 241/605
(58) Field of Search ..................... 241/186.4, 101.742, 241/101.74, 101.76, 101.762, 101.763, 101.77, 604, 605, 80

(56) References Cited

U.S. PATENT DOCUMENTS

| | | | |
|---|---|---|---|
| 4,092,004 | * | 5/1978 | Leverenz et al. ............... 241/101.76 |
| 4,830,292 | | 5/1989 | Frey . |
| 5,622,323 | | 4/1997 | Krueger et al. . |

OTHER PUBLICATIONS

Brochure entitled "Kwikmixer—3" Henke Machine Inc.
Advertising material entitled "Ez Feed 280" for Highline Mfg, Inc.

Brochure entitled "Bale Processor" from Jiffy by Westward Products Ltd.

* cited by examiner

*Primary Examiner*—Mark Rosenbaum
(74) *Attorney, Agent, or Firm*—Killworth, Gottman, Hagan & Schaeff, L.L.P.

(57) ABSTRACT

An animal feed processor for producing a mixture of baled crop material and a supplemental feed. The animal feed processor comprises a container for receiving baled crop material mounted on a chassis and a hopper for receiving the supplemental feed also mounted on the chassis. A disintegrator for shredding the baled crop material is mounted within the container that also has a slot on one side to discharge the disintegrated baled crop material. The hopper includes an auger mechanism for discharging the supplemental feed from the hopper to the same side of the animal feed processor as the disintegrated baled crop material. The animal feed processor further includes a fork lift mounted on the back end of the chassis for lifting bales into the baled crop material container and a hitch at the front end of the chassis for coupling the animal feed processor to a tractor. In one embodiment of the invention, the hopper is mounted in front of the baled crop material container while in a further embodiment, the hopper is mounted in back of the baled crop material container. The flow of supplemental feed from the hopper may be controlled by adjustable openings from the hopper to the auger as well as by controlling the speed of the motors turning the augers.

24 Claims, 6 Drawing Sheets

ANIMAL FEED PROCESSOR

FIELD OF THE INVENTION

The present invention relates generally to animal feed processors and more particularly to an animal feed processor for discharging a supplemental feed onto disintegrated baled crop material discharged from the processor.

BACKGROUND

Crop materials, such as straw, hay or other forage are often baled for storage and transportation. It is then necessary to undo or break the bales apart in order to spread the crop materials for animal bedding or to dispense the crop materials as feed.

Over the years many different types of machines have been developed to undo or break apart bales of crop materials, this has become somewhat challenging with the advent of large rectangular or circular bales since these cannot be handled manually. Different types of machines are depicted in U.S. Pat. No. 3,979,077 which issued to Dalman on Sep. 7, 1976; U.S. Pat. No. 4,448,361 which issued to Marcy on May 15, 1984; U.S. Pat. No. 4,449,672 which issued to Morlock et al on May 22, 1984; U.S. Pat. No. 4,524,916 which issued to Keyes et al on Jun. 25, 1985; U.S. Pat. No. 4,657,191 which issued to Dwyer et al on Apr. 14, 1987; U.S. Pat. No. 4,779,810 which issued Frey on Oct. 25, 1988; U.S. Pat. No. 5,255,867 which issued to Whittleton et al on Oct. 26, 1993; U.S. Pat. No. 5,340,040 which issued to Bussiere et al on Aug. 23, 1994; U.S. Pat. No. 5,601,241 which issued to Brewster on Feb. 11, 1997 and U.S. Pat. 5,738,87 which issued to Vandenberg on Apr. 14, 1998. All of these machines have been designed to undo, break apart or disintegrate bales of crop materials and can lay the loose materials down in a row as the machine is moving.

The machine typically comprises a container for receiving the bales, a disintegrator often in the form of a roller with cutters or flails for chopping or shredding the material from the bale, a mechanism to direct the bale to the disintegrator and a discharge slot such that the crop material is discharged from the bail processor to the ground forming a windrow as the machine moves forward.

Often, it is desirable to provide a combination of feed materials to the animals to provide them with a more nutritious and balanced diet as well as to make the feed more palatable to the animals. The feed mixture would normally include a crop (forage) material such as hay or straw together with a supplemental feed such as whole grain, chopped grain, corn, vitamin or other supplements, and high protein feed pellets or cakes.

SUMMARY OF THE INVENTION

It is therefore an object of this invention to provide an animal feed processor which discharges a supplemental feed onto the disintegrated baled crop materials discharged from the processor.

This and other objects are achieved in an animal feed processor that comprises a container for receiving baled crop material mounted on a chassis and a hopper for receiving the supplemental feed also mounted on the chassis. A disintegrator for shredding the baled crop material is mounted within the container; the container also has a slot on one side to discharge the disintegrated baled crop material. The hopper includes a mechanism for discharging the supplemental feed from the hopper also to the one side of the animal feed processor.

The animal feed processor may further include a fork lift mounted at the back end of the chassis for lifting bales into the baled crop material container. A hitch may be fixed to the front end of the chassis for coupling the animal feed processor to a tractor.

In one embodiment of the invention the hopper is mounted in front of the baled crop material container while in a further embodiment the hopper is mounted in back of the baled crop material container.

In accordance with another aspect of the invention, a conveyor such as an auger has an input located at the base of the hopper and an output located near the baled crop material discharge mechanism to discharge the feed supplement. The auger is driven by a speed controlled motor such as a hydraulic motor.

With regard to a further aspect of the invention, an adjustable opening at the input to the auger, the speed of the motor or both may be used to control the flow of supplemental feed.

In the embodiment in which the hopper is located in front of the container, the conveyor for discharging the supplemental feed may comprise a drop box located below and at the back of the baled crop material container, a first auger having a first end within the base of the hopper and a second end connected to the drop box and a second auger having a first end connected to the drop box and a second end mounted above and near the baled crop material discharge mechanism. In addition the hopper may have a conduit passing through it from front to back to receive a drive shaft to drive the disintegrator.

In accordance with further aspects of the invention, the augers are independently driven by speed controlled hydraulic motors that can receive their power from the tractor hydraulics. In addition, an adjustable discharge door on the discharge slot may be used to direct the flow of the disintegrated baled crop material to form a windrow on the ground or to fill a feed bunk as the feed processor moves forward. An adjustable spout mounted on the cylindrical conduit at the end of the auger may be used to direct the flow of the supplemental feed onto the windrow or into the feedbunk.

Many other objects and aspects of the invention will be clear from the detailed description of the drawings.

BRIEF DESCRIPTION OF THE DRAWINGS

Embodiments of the invention are described with reference to the drawings in which.

DETAILED DESCRIPTION OF THE DRAWINGS

Over the years a number of bale processors have been developed for disintegrating bales of crop materials and spreading the shredded materials either as bedding or as feed. Various forage crop materials such as hay or straw from different crops may be made into bales that are small or large, rectangular or round. Most processors have been designed to be pulled by a tractor, however, this need not be the case as others have been mounted on trucks, for example. Also it is usual to use the power take-off and the hydraulics from the tractor to operate the crop material processors.

Figure 1:
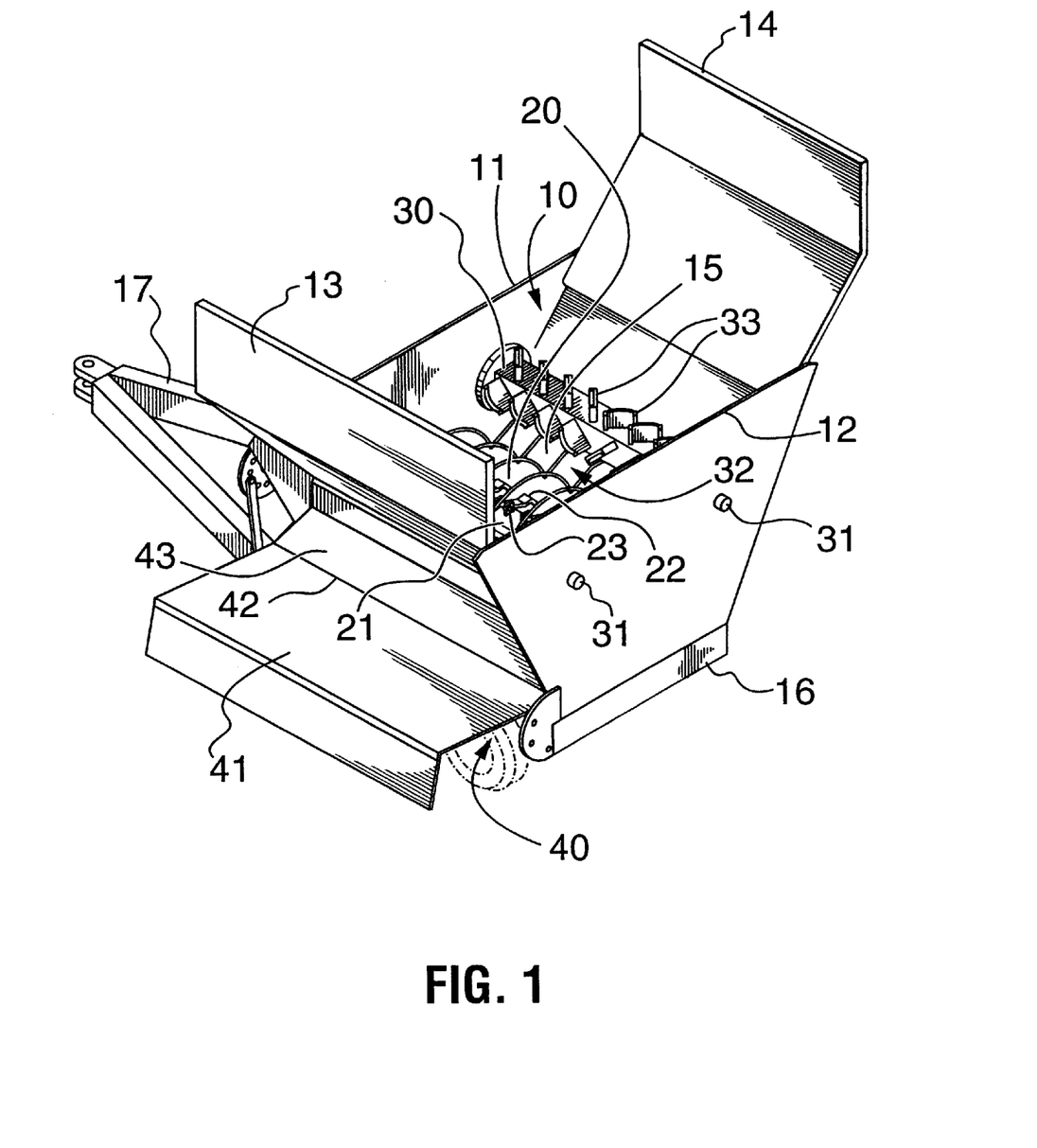
FIG. 1 is an isometric view of a baled crop material processor.

FIG. 1 illustrates one of a variety of baled crop processors which may be used in conjunction with the present invention. The baled crop material processor 1 includes a bale container 10 into which bales 2 (as shown schematically in FIG. 3) of crop material are placed. The container is fixed to a chassis 16, the front end of which is extended to form a hitch 17. The bale container 10 further has a front wall 11, a back wall 12, two sidewalls 13, 14 and a partial base 15 which extends from wall 14 under the container 10.

A disintegrator 20 is mounted within the container 10 parallel to the side walls 13 and 14. The disintegrator 20 includes a flair roller 21 connected to a power taleoff coupler located on the container 10 wall 11. The roller 21 rotates about its longitudinal axis. The disintegrator 20 also includes a plurality of flails 22 intermittently spaced circumferentially and longitudinally about the roller 21. The flails 22 extend radially from the flail roller 21 and are connected to the roller 21 by pivots 23.

The bale processor 1 further includes a combination of mechanisms for manipulating the bale and directing it to the disintegrator 20 such that the bale remains generally intact for disintegration primarily by the disintegrator 20. The combination of mechanisms includes at least a pair of rollers 30, each roller 30 mounted parallel to and between the disintegrator 20 and a side wall 13 or 14 respectively. Each roller 30 is also mounted on bearings 31 between the end walls 11 and 12 at a location higher than the disintegrator 20 and near the side wall 13, 14. The rollers 30 in combination with the walls 13, 14 define a support surface on which the bale of crop material is supported. Outside of the container 10 on wall 11, each roller 30 is connected to a hydraulic motor for rotating the roller 30 in either direction as desired by the operator. The rollers 30 further include paddles 33 spaced circumferentially and longitudinally along the rollers 30. The paddles 33 project outwardly from the rollers 30. The spacing between the two rollers 30 defines a disintegration opening 32 where the bale encounters the disintegrator 20.

The walls 13 and 14 together with the rollers 30 support the bale within the container 10 as the rollers 30 rotate the bale. While the bale rotates, the rotating flails 22 on the flail roller 20 grasp some of the crop material on the bale, effectively disintegrating the bale.

Also mounted inside the container 10 is a series of hoops 34 which prevent the bale or bundles of loose crop material from dropping into the disintegrator 20 all at once. The hoops 34 are mounted between the sidewalls 13 and 14 of container 10.

A discharge opening 40 formed by wall 13, the partial base 15 and the end walls 11 and 12 is located at the bottom of the side wall 13 of container 10 through which the flails 22 on the flail wheel 20 drive the shredded crop material to discharge it from the processor 1. In addition, a discharge door 41 is hinged at 42 to an extension 43 from the side wall 13 such that it may be raised or lowered to guide the shredded bale material as it is discharged. When the discharge door 41 is raised, the discharged material will be spread over a wide area; when the discharge door 41 is lowered, the discharged material will form a windrow as the machine 1 moves; and when the discharge door 41 is in an intermediate position, the discharged material can be directed into a feed bunk.

Figure 2:
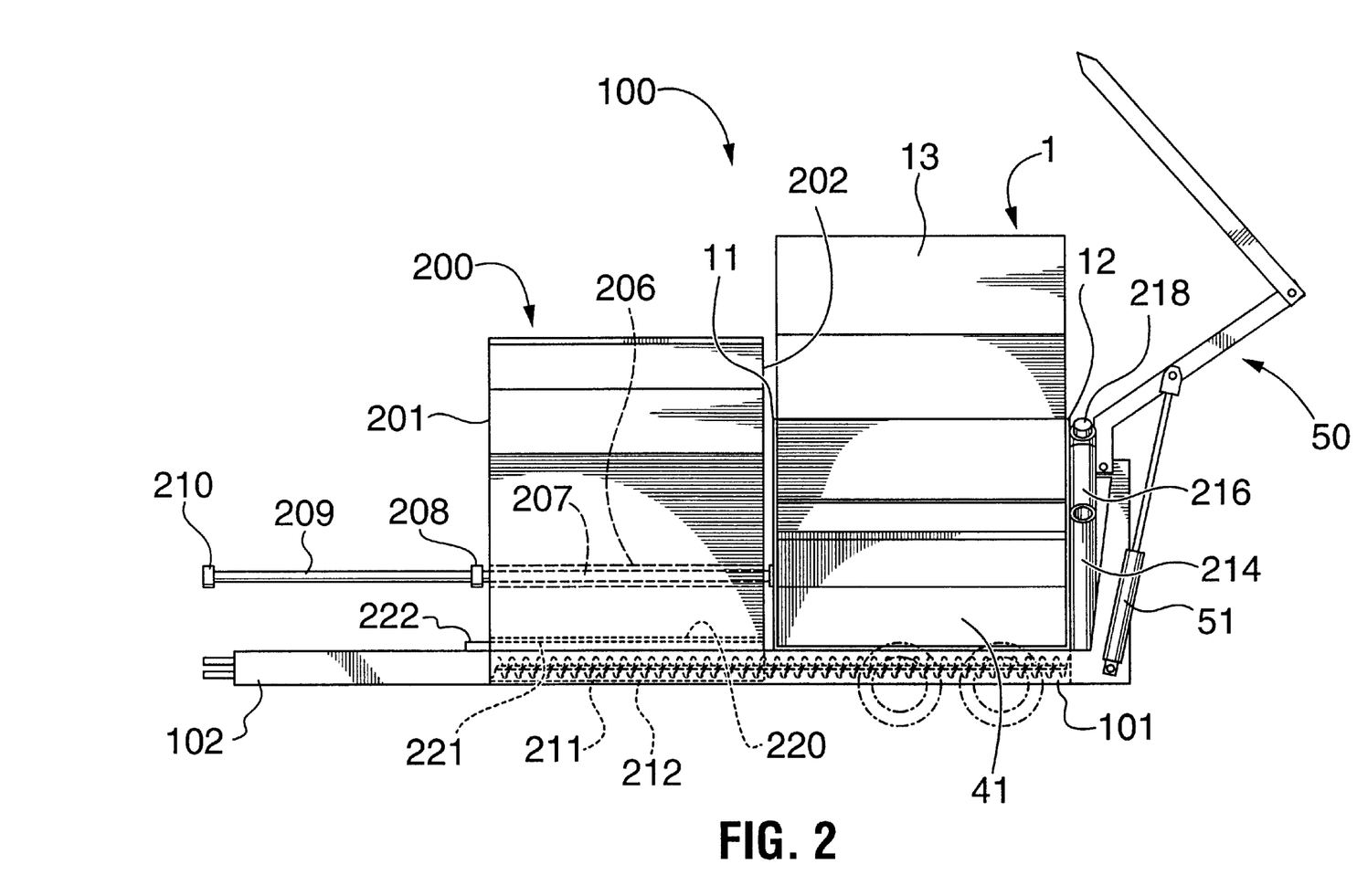
FIG. 2 is a side view of one embodiment of the animal feed processor in accordance with the present invention.
Figure 3:
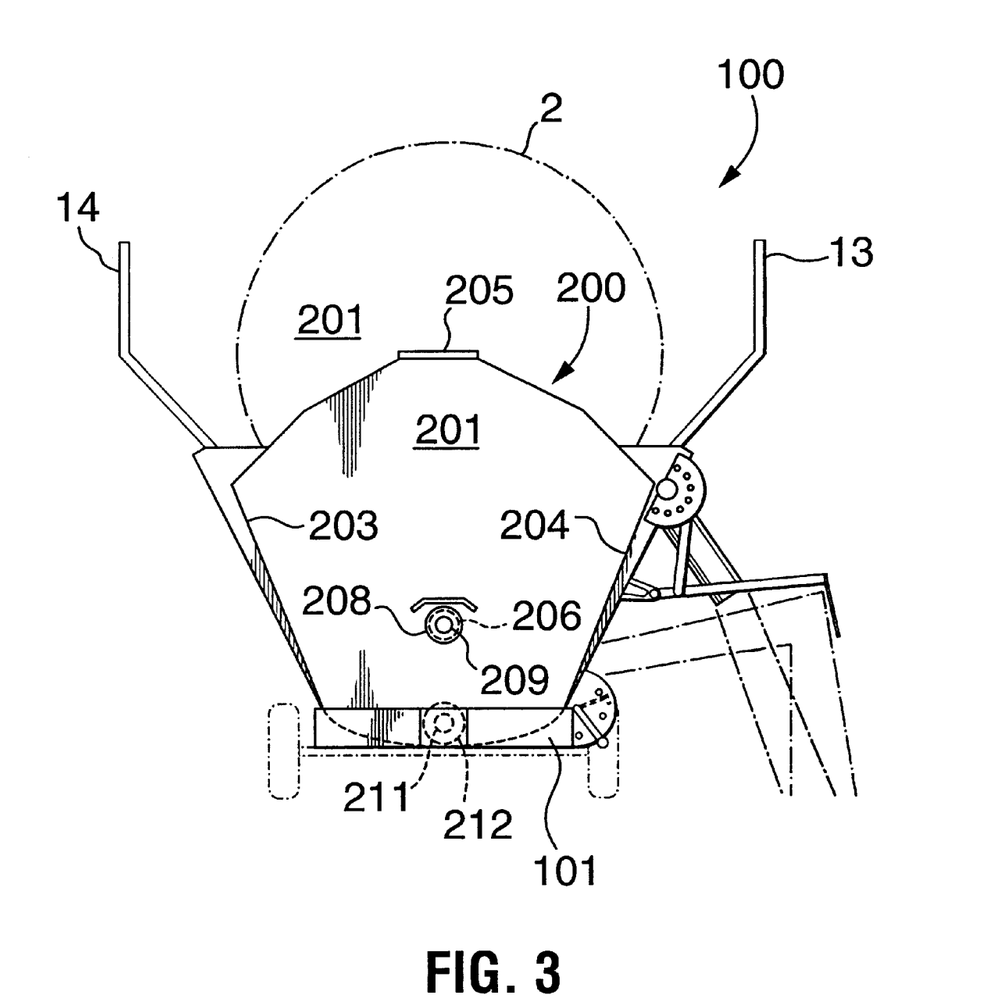
FIG. 3 is a front view of the animal feed processor in FIG. 2.
Figure 4:
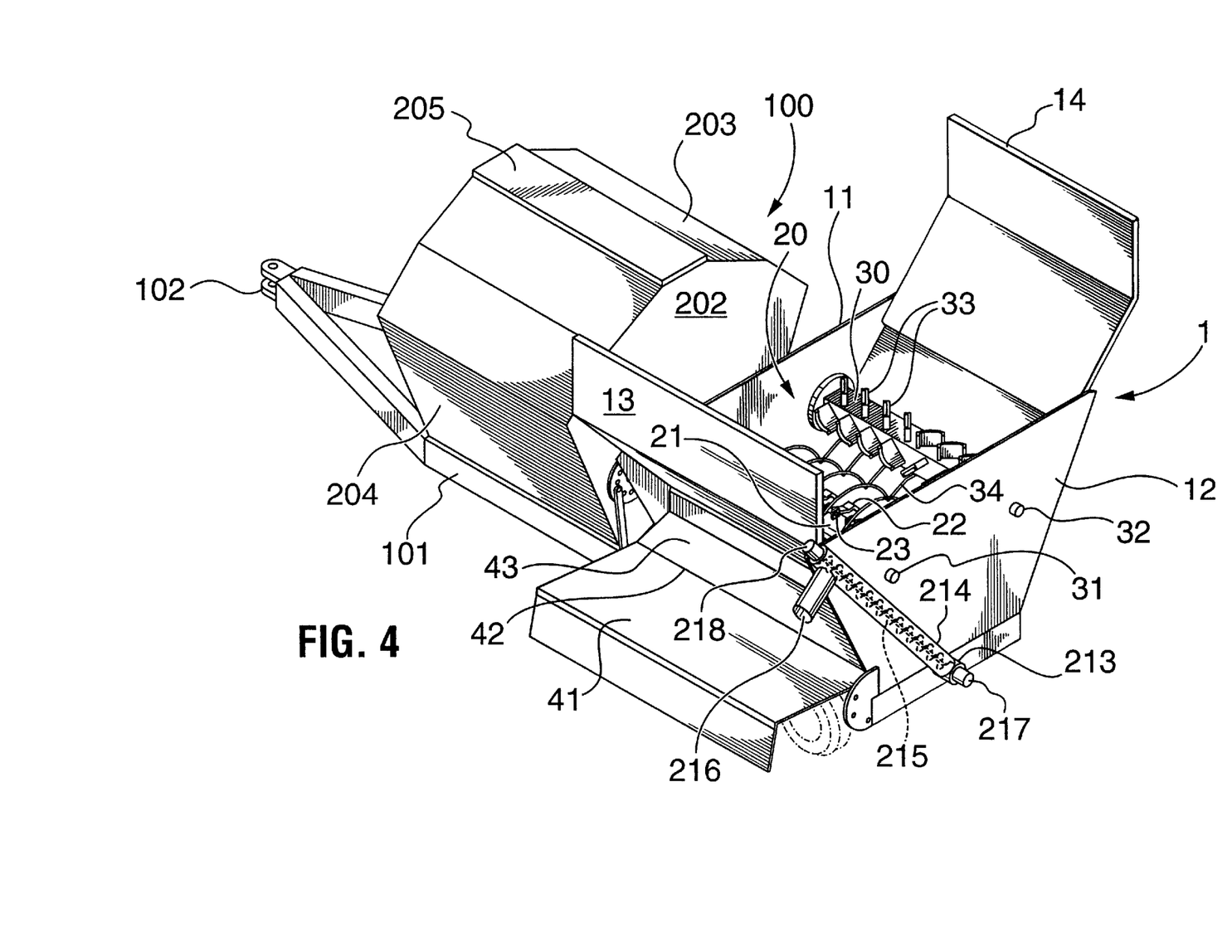
FIG. 4 is an isometric view of the animal feed processor in FIG. 2.

FIGS. 2, 3 and 4 illustrate one embodiment of the animal feed processor 100 in accordance with the present invention. The processor 100 includes a baled crop material processor 1 which may be any one of the prior art processors referred to above or as described with reference to FIG. 1. The bale processor 1 is fixed to a chassis 101 that extends forward from the processor 1 to form a hitch section 102. A hopper 200 is mounted on the chassis 101 between the bale processor 1 and the hitch section 102. The hopper 200 preferably includes vertical end walls end walls 201 and 202 and sloping side walls 203 and 204 that meet at the bottom of hopper 200 to form a base such that the supplemental feed falls to a narrow area at the bottom of the hopper 200. A hinged cover 205 sits over the top of the hopper 200 such that it may be opened to fill the hopper with whatever supplemental feed the operator wishes to feed to the cattle. In addition, hopper 200 includes a conduit 206 passing through it from front wall 201 to back wall 203 in which is located a rotatable shaft 207 mounted on bearings. One end of the shaft 207 is connected to the disintegrator roller 21 (shown in FIG. 1) and the other end is connected to a universal coupler 208 which itself is connected to a further shaft 209 and coupler 210 for connection to a tractor. The tractor power take-off drives the disintegrator 20 in the bale processor 1.

In combining feeds for cattle, it is preferable to place the shredded forage material in a windrow or in a feed bunk before adding the supplemental feed; this is particularly true when cattle are being fed from a windrow since all of the supplemental feed would be on the ground if it was dispensed first. However, this is not always the case, for example none of the supplemental feed would be lost if the cattle are being fed in a feed bunk since the cattle would forage down into the feed bunk to reach the supplemental feed. In the embodiment of FIGS. 2, 3 and 4, the apparatus for taking the supplemental feed from the hopper 200 and spreading it into the shredded forage comprises a first auger 211 with its cylindrical conduit 212 for carrying the supplemental feed from the hopper 200 to the back wall 12 of the bale processor 1, a drop box 213 coupled to the conduit 212 and to a further auger 215 with its cylindrical conduit 214 that is mounted along the back wall 12. Auger 215 carries the supplemental feed up past the side wall 13 to a spout 216 for spreading the supplemental feed into the disintegrated bale material discharged from the bale processor 1.

The motors 217 and 218 driving the augers 211 and 215 respectively would normally be speed controlled hydraulic motors, however other motors such as electric motors may also be used. It is also preferred that the motors be independently controlled.

One aspect of the invention it the ability to control the amount of supplemental feed that is projected out of the spout 216. One method of controlling flow is to control the amount of supplemental feed that reaches auger 211 from hopper 200 . A control member 220 in the hopper 200 is located just above the auger 211 and includes at least one control door 221 that is capable of substantially preventing the supplemental feed from flowing into conduit 212 when all of the control doors 221 are closed and is also capable of varying the flow depending on the amount the control doors 221 are open. An axial control member 222 is coupled to the control doors 221 for adjusting the position of the control doors 221. In this method, it is important for the auger 215 to operate at a greater capacity than auger 211 so that the feed does not clog the drop box 213.

Another method of controlling the flow of the feed supplement out of spout 216 is to control the speed of the hydraulic motor 217 for auger 211. However, care has to be taken since auger 211 can become clogged if more feed drops into the auger 211 than the auger 211 is carrying to the drop box 213 and to auger 215.

In situations where it is not essential to place the supplemental feed over the discharged crop material, auger 215 with its conduit 214 may be placed directly into the hopper 200 such that the bottom of the auger 215 is in the base of hopper 200 and the auger 215 extends out from the side wall 204 to carry the supplemental feed to the spout 216 as described above.

In addition as illustrated in FIG. 2, a fork lift 50 may be mounted on the chassis 101 behind the bale processor 1. The fork lift 50 is controlled by hydraulic pistons 51 operated from the tractor.

Figure 5:
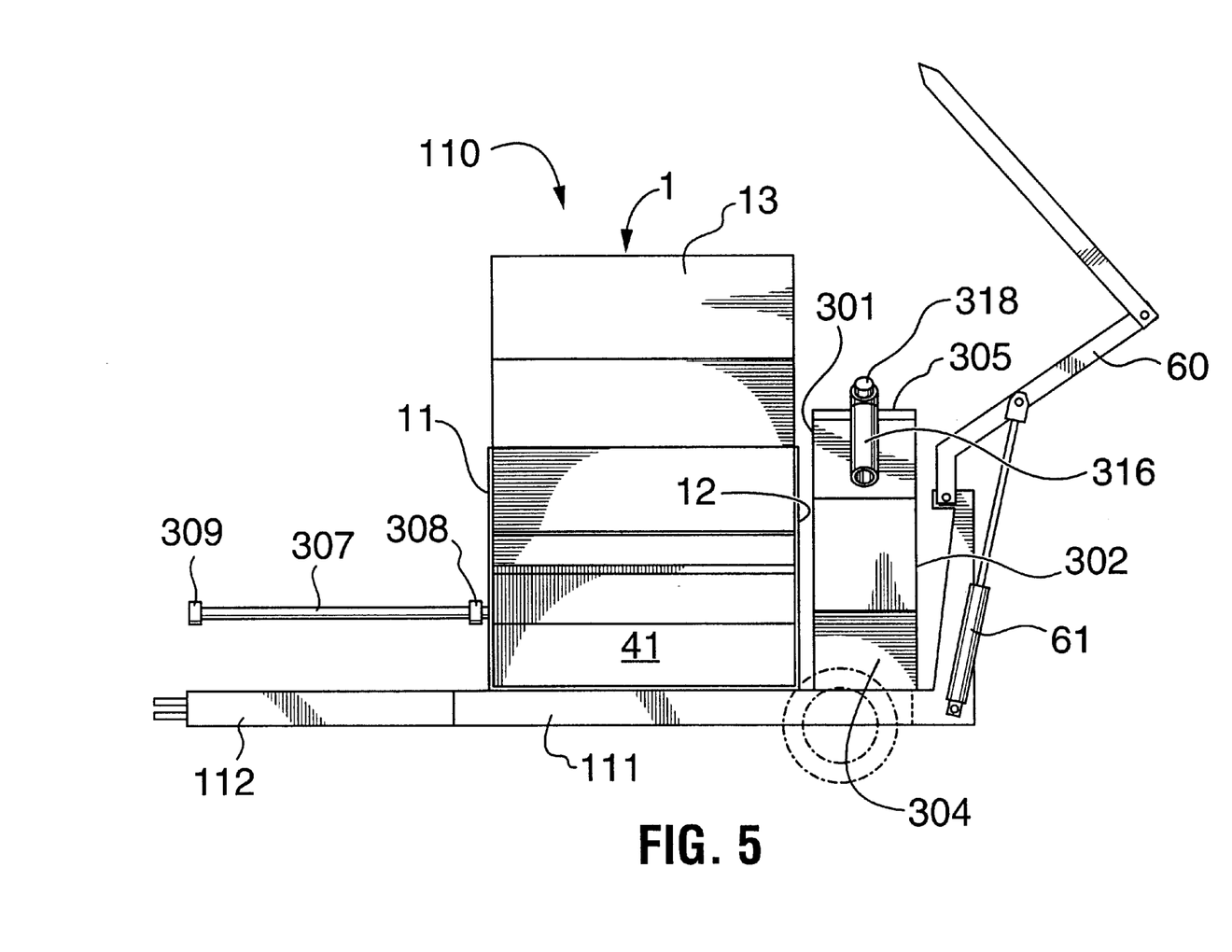
FIG. 5 is a side view of another embodiment of the animal feed processor in accordance with the present invention.
Figure 6:
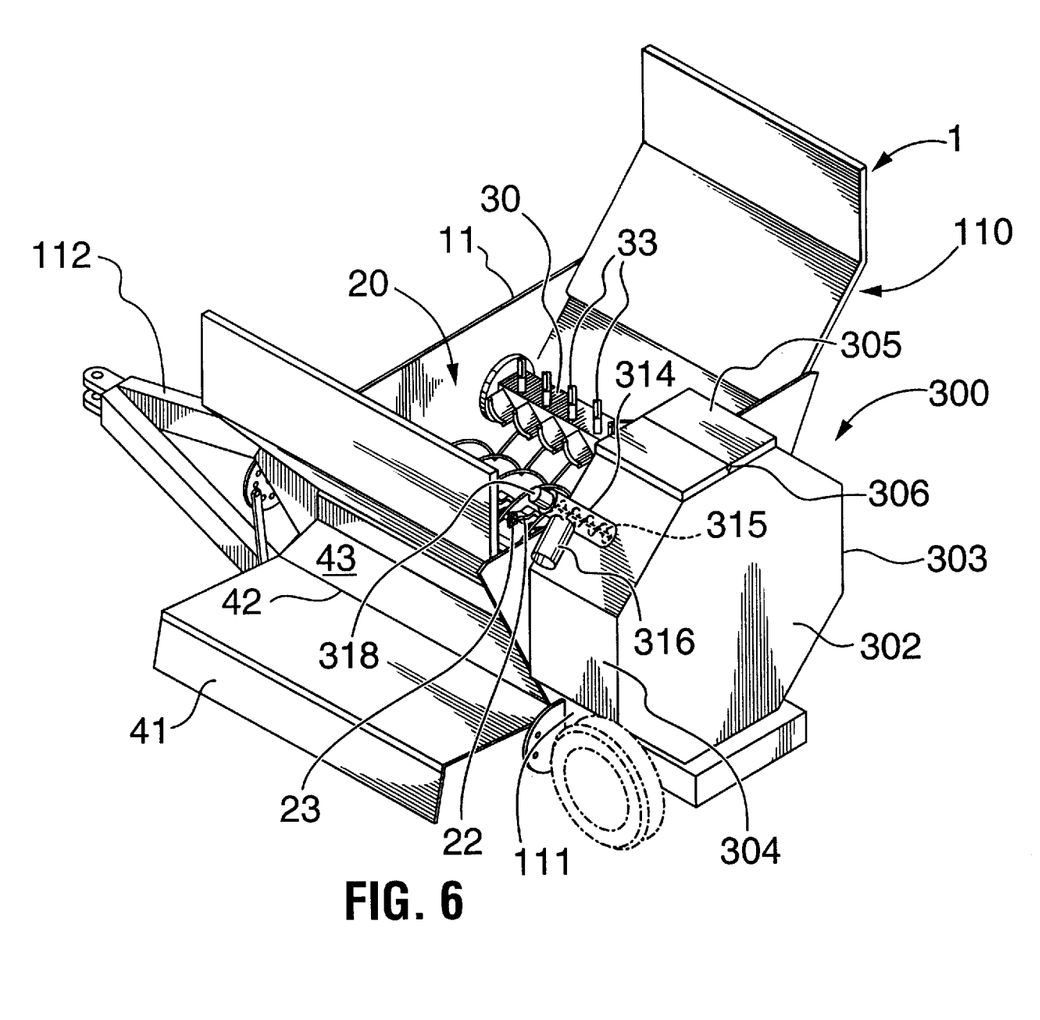
FIG. 6 is an isometric view of the animal feed processor in FIG. 5.

FIGS. 5 and 6 illustrate a second embodiment of a bale processor 110 in accordance with the present invention. The processor 110 includes a baled crop materials processor 1 which may be any one of the prior art processors referred to above or as described with reference to FIG. 1. The bale processor 1 is fixed to a chassis 111 that extends forward from the processor 1 to form a hitch section 112. In addition, a power take-off shaft 307 is connected to the disintegrator roller 21 (shown in FIG. 1) through a universal coupler 308 and the other end is connected to a further universal coupler 309 for connection to a tractor. The tractor power take-off drives the disintegrator 20 in the bale processor 1.

A hopper 300 is mounted on the chassis 111 behind the bale processor 110. The hopper 300 preferably includes vertical end walls 301 and 302 and sloped side walls 303 and 304 that meet at the bottom of hopper 300 to form a base such that the supplemental feed falls to a narrow area at the bottom of the hopper 300. A split cover 305 that is hinged in the centre 306 to open from either side sits over the top of the hopper 300 such that it may be opened to fill the hopper with whatever supplemental feed the operator wishes to feed to the cattle.

In the embodiment of FIGS. 5 and 6, the apparatus for taking the supplemental feed from the hopper 300 and spreading it into the shredded forage comprises an auger 315 with its conduit 314 that is mounted in the hopper 300 for carrying the supplemental feed from the hopper 300 to a spout 316 for spreading the supplemental feed into the disintegrated baled crop material discharged from the bale processor 1.

The motor 318 driving the auger 315 would normally be a speed controlled hydraulic motor, however other motors such as an electric motor may also be used.

The amount of supplemental feed that is projected out of the spout 216 may be controlled in two ways. One method of controlling flow is to control the amount of supplemental feed that reaches auger 315 from hopper 300. This may be done by a control door on conduit 314 which could be adjusted to allow the desired amount of supplemental feed to enter the conduit 314. Alternately, the flow of the supplemental feed out of spout 316 may be controlled by varying the speed of the hydraulic motor 318 for auger 315.

In addition as illustrated in FIG. 5, a fork lift 60 may be mounted on the chassis 111 behind the bale hopper 304. The fork lift 60 is controlled by hydraulic pistons 61 operated from the tractor.

A specific advantage of the present invention is an apparatus that can provide a feed mixture within the field by combining the feeds in desired proportions during one operation, resulting in the efficient use of feed and a substantial saving in time. In addition, the apparatus in accordance with the present invention with its low centre of gravity is very stable.

Many modifications in the above described embodiments of the invention can be carried out without departing from the scope thereof, and therefore the scope of the present invention is intended to be limited only by the appended claims.

What is claimed is:

1. An animal feed processor for producing a mixture of baled crop material and a supplemental feed comprising:
    a chassis having front and back ends;
    a container mounted on the chassis for the baled crop material;
    means mounted within the container for disintegrating the baled crop material;
    means to one side of the container for discharging the disintegrated baled crop material to one side of the animal feed processor;
    a hopper mounted on the chassis between the chassis front end and the baled crop material container for the supplemental feed;
    a conveyor having an input located at the base of the hopper and an output located near the baled crop material discharge for discharging the supplemental feed from the hopper to the one side of the animal feed processor.

2. An animal feed processor for producing a mixture of baled crop material and a supplemental feed as claimed in claim 1 wherein fork lift means is mounted on the chassis back end for lifting bales into the baled crop material container.

3. An animal feed processor for producing a mixture of baled crop material and a supplemental feed as claimed in claim 1 wherein hitch means is fixed to the chassis front end for coupling the animal feed processor to a tractor.

4. An animal feed processor for producing a mixture of baled crop material and a supplemental feed as claimed in claim 1 wherein the conveyor comprises an auger having a conduit.

5. An animal feed processor for producing a mixture of baled crop material and a supplemental feed as claimed in claim 4 wherein the conduit includes an adjustable opening at the input to control the flow of supplemental feed into the conduit.

6. An animal feed processor for producing a mixture of baled crop material and a supplemental feed as claimed in claim 4 wherein the auger is driven by a speed controlled motor.

7. An animal feed processor for producing a mixture of baled crop material and a supplemental feed as claimed in claim 6 wherein the speed controlled motor is a hydraulic motor.

8. An animal feed processor for producing a mixture of baled crop material and a supplemental feed as claimed in claim 4 wherein the output of the conduit includes a spout for directing the flow of the supplemental feed.

9. An animal feed processor for producing a mixture of baled crop material and a supplemental feed as claimed in claim 1 wherein a conduit is located through the hopper from the front to the back to receive a drive shaft to drive the disintegrating means.

10. An animal feed processor for producing a mixture of baled crop material and a supplemental feed as claimed in claim 1 wherein the supplemental feed discharging means comprises a conveyor having an input located at the base of the hopper and an output located near the baled crop material discharge means at the back of the baled crop material container.

11. An animal feed processor for producing a mixture of baled crop material and a supplemental feed as claimed in claim 10 wherein the conveyor comprises:
   a drop box located below and at the back of the baled crop material container;
   a first auger having a conduit with a first end within the base of the hopper and a second end connected to the drop box; and
   a second auger having a conduit with a first end connected to the drop box and a second end mounted above and near the baled crop material discharge means.

12. An animal feed processor for producing a mixture of baled crop material and a supplemental feed as claimed in claim 11 wherein the first end of the first conduit includes an adjustable opening to control the flow of supplemental feed into the first conduit.

13. An animal feed processor for producing a mixture of baled crop material and a supplemental feed as claimed in claim 11 wherein the first auger and the second auger are driven by speed controlled motors.

14. An animal feed processor for producing a mixture of baled crop material and a supplemental feed as claimed in claim 13 wherein the speed controlled motors are hydraulic motors.

15. An animal feed processor for producing a mixture of baled crop material and a supplemental feed as claimed in claim 13 wherein the speed controlled motors are independently controlled hydraulic motors.

16. An animal feed processor for producing a mixture of baled crop material and a supplemental feed as claimed in claim 11 wherein the second end of the second conduit includes a spout for directing the flow of the supplemental feed.

17. An animal feed processor for producing a mixture of baled crop material and a supplemental feed as claimed in claim 1 wherein the container discharging means includes an adjustable discharge door for directing the flow of the disintegrated baled crop material.

18. An animal feed processor for producing a mixture of baled crop material and a supplemental feed comprising:
   a chassis having front and back ends;
   a container mounted on the chassis for the baled crop material;
   means mounted within the container for disintegrating the baled crop material;
   means to one side of the container for discharging the disintegrated baled crop material to one side of the animal feed processor;
   a hopper mounted on the chassis between the chassis back end and the baled crop material container for the supplemental feed; and
   a conveyor having an input located at the base of the hopper and an output located near the baled crop material discharge means for discharging the supplemental feed from the hopper to the one side of the animal feed processor.

19. An animal feed processor for producing a mixture of baled crop material and a supplemental feed as claimed in claim 18 wherein the conveyor comprises an auger having a conduit.

20. An animal feed processor for producing a mixture of baled crop material and a supplemental feed as claimed in claim 19 wherein the conduit includes an adjustable opening at the input to control the flow of supplemental feed into the conduit.

21. An animal feed processor for producing a mixture of baled crop material and a supplemental feed as claimed in claim 19 wherein the auger is driven by a speed controlled motor.

22. An animal feed processor for producing a mixture of baled crop material and a supplemental feed as claimed in claim 21 wherein the speed controlled motor is a hydraulic motor.

23. An animal feed processor for producing a mixture of baled crop material and a supplemental feed as claimed in claim 19 wherein the output end of the conduit includes a spout for directing the flow of the supplemental feed.

24. An animal feed processor for producing a mixture of baled crop material and a supplemental feed as claimed in claim 18 wherein the discharging means includes an adjustable discharge door for directing the flow of the disintegrated baled crop material.

* * * * *